United States Patent [19]

Glickstein et al.

[11] 4,034,123
[45] July 5, 1977

[54] COMPRESSED, FREEZE-DRIED COTTAGE CHEESE AND METHOD OF MAKING

[75] Inventors: Myer Glickstein; Justin M. Tuomy, both of Framingham, Mass.

[73] Assignee: The United States of America as represented by the Secretary of the Army, Washington, D.C.

[22] Filed: Feb. 13, 1976

[21] Appl. No.: 657,985

[52] U.S. Cl. .............................. 426/582; 426/385; 426/512; 426/810

[51] Int. Cl.² .......................................... A23C 19/00

[58] Field of Search ............ 426/444, 385, 36, 130, 426/384, 453, 454, 512, 524, 582, 330.2, 334, 810; 34/5

[56] References Cited

UNITED STATES PATENTS 3,111,410  11/1963  Rode ................................. 426/36
3,591,390  7/1971  Flickinger et al. ............... 426/582

OTHER PUBLICATIONS

Kosikowski "Cheese and Fermented Milk Foods" Frank Kosikowski Publisher 1966, p. 283.

Primary Examiner—Raymond N. Jones
Assistant Examiner—R. B. Penland
Attorney, Agent, or Firm—Nathan Edelberg; Robert P. Gibson; Charles C. Rainey

[57] ABSTRACT

Compacted, freeze-dried cottage cheese which is readily rehydratable to form an acceptable reconstituted cottage cheese food product, and method of making the same involving blending a freeze-dried, low milk fat (dry curd) cottage cheese and a freeze-dried, high milk fat (creamed) cottage cheese, preferably in about equal proportions, and compressing the resulting blend to a compression ratio of from about 3:1 to about 4:1.

4 Claims, No Drawings

COMPRESSED, FREEZE-DRIED COTTAGE CHEESE AND METHOD OF MAKING

The invention described herein may be manufactured, used, and licensed by or for the Government for governmental purposes without the payment to us of any royalty thereon.

BACKGROUND OF THE INVENTION

This invention relates to compressed, freeze-dried cottage cheese which is readily rehydratable to form an acceptable reconstituted cottage cheese food product and which more particularly has good curd identity and mouth feel in the rehydrated state. The invention also relates to the method of producing such a compressed, freeze-dried cottage cheese.

It has for a number of years been an objective of the Armed Forces to provide members thereof with rations which would as closely as possible resemble the types and quality of foods which they are accustomed to being served at home. It has also been an important objective to reduce the bulk and weight of ration components as much as possible without too great a sacrifice in quality of the foods as they are served. The latter objective has become very important in connection with submarines since space is always at a premium therein.

Cottage cheese is a highly desirable component of salads for civilians, but normally is quite perishable and, therefore, requires refrigeration. It has been subjected to freeze-drying to preserve it so that it may be stored at room termperature or even higher temperatures for long periods of time. Until now, however, compacting of freeze-dried cottage cheese has been unsuccessful because the curd has heretofore lost its identity as a result of compression, so much so that rehydrated cottage cheese prepared from the compacted, freeze-dried cottage cheese of the prior art has been mushy or soupy, thus having none of the physical characteristics usually associated with fresh cottage cheese.

It is an object of the present invention to provide a method of producing compacted, freeze-dried cottage cheese which is storage-stable and is capable of being rehydrated to form cottage cheese which is organoleptically comparable to freshly prepared cottage cheese.

Other objects and advantages will become apparent from the following description of the invention.

SUMMARY OF THE INVENTION

Compacted, freeze-dried cottage cheese which is readily rehydratable to form an acceptable, reconstituted cottage cheese food product having good curd identity, and method of making the same involving blending a freeze-dried, low milk fat (dry curd of less than 0.5 percent milk fat prior to freeze-drying) cottage cheese and a freeze-dried, high milk fat (creamed, having about 4.0 to 4.5 percent milk fat prior to freeze-drying) cottage cheese, preferably in about equal proportions, and compressing the resulting blend at a pressure of from about 500 psi to about 1000 psi to a compression ratio of from about 3:1 to about 4:1.

DESCRIPTION OF THE PREFERRED EMBODIMENT

We have discovered that, contrary to prior experience in the art of cottage cheese production, it is possible to compact freeze-dried cottage cheese in such a manner that the compacted freeze-dried cottage cheese product is capable of being rehydrated within a short time to obtain reconstituted cottage cheese having good curd identity as well as other desirable organoleptic characterisitics normally associated with cottage cheese as it is conventionally produced and merchandised. Curd identity is a most important characteristic of cottage cheeses since there is less eye and consumer appeal in a cottage cheese product which lacks good curd identity even though it may have a satisfactory taste. Cottage cheese which tends to be weak, excessively moist, mushy, or pasty will not have the consumer acceptance normally expected.

Unless otherwise indicated, all percentages disclosed herein are percentages by weight.

We generally begin by obtaining freshly made, nondehydrated cottage cheeses of two types: (a) dry curd cottage cheese of less than 0.5 percent milk fat (large curd size), and (b) creamed cottage cheese of about 4.0 to 4.5 percent milk fat (large curd size), each preferably having a normal sodium chloride level of about 1.0 percent by weight. Each of these cottage cheeses is processed separately to form a freeze-dried cottage cheese therefrom in accordance with the method described in Military Specification MIL-C-43274B, dated Sept. 30, 1970, entitled "Cheese, Cottage, Dehydrated, Creamed". To accomplish this, each cottage cheese is spread out on freezing trays and frozen preparatory to freeze dehydration. After freezing, the frozen cottage cheese is dehydrated at an absolute pressure not exceeding 1.5 millimeters of mercury to a moisture content of less than 2.0 percent by weight.

Equal quantities of the two freeze-dried cottage cheeses are blended by tumbling the mixture for 2 minutes, care being taken to avoid mechanical breakdown of the particle size of the freeze-dried cottage cheeses. About 70 grams of the 50:50 blend of the freeze-dried cottage cheeses are placed in the mold cavity of a Denision Division Multipress, manufactured by Abex Corporation of Columbus, Ohio, and having a 20 ton capacity. The diameter of the mold cavity is 3⅝ inches. The piston is brought to bear on the blend of cottage cheeses and the pressure is increased to 1000 psi and held for 10 seconds; then the piston is withdrawn and the resulting disc of compacted, freeze-dried cottage cheese is removed from the Denison press. The handling of the cottage cheese blend is carried out in a closed chamber at a sufficiently low moisture level so that the moisture content of the cottage cheese blend remains below 2.0 percent by weight. Four discs of the compacted, freeze-dried cottage cheese, prepared as described above and having a thickness of about 1 inch and a compression ratio of about 3.3:1 are placed in a No. 2½ metal can and hermetically sealed therein following flushing of the can with nitrogen and then drawing of a vacuum of 27 to 29 inches of mercury thereon prior to and during the hermetic sealing of the can. Compression ratio is the ratio of the volume of the blend of freeze-dried cottage cheeses before compression and the volume of the compacted, freeze-dried cottage cheese.

Following storage of the can of discs of compacted, freeze-dried cottage cheese, the can is opened and the discs are rehydrated in accordance with either of two different procedures. The preferred rehydration procedure involves placing a disc (or a plurality of discs) in a vessel, preferably made of stainless steel, and adding the appropriate amount of water to the vessel, usually about 270 grams of water for each 70-gram disc of compacted, freeze-dried cottage cheese. The disc is permitted to stand overnight in the vessel in contact with the water under refrigeration (40°–50° F). At the end of this time, a wide spatula or fork is used to carefully turn the product over and accomplish blending without mashing, which latter action would have an adverse effect on the curd identity of the reconstituted cottage cheese.

The other rehydration procedure involves breaking a disc of the compacted, freeze-dried cottage cheese into small pieces, preferably by hand, then adding the required quantity of water, usually about 270 grams per 70-gram disc, and allowing the pieces of compacted, freeze-dried cottage cheese to stand in contact with the water for 10 minutes, then carefully blending the cottage cheese with a fork without mashing it. Each 70-gram disc of compacted, freeze-dried cottage cheese produces about 340 grams of reconstituted cottage cheese. Thus a No. 2½ can containing four 70-gram discs of compacted, freeze-dried cottage cheese produces approximately 1.36 kg or 3.0 lbs of reconstituted cottage cheese.

Although the invention has been described above in terms of the production of discs of compressed, freeze-dried cottage cheese blends, one component of which has a very low milk fat content while the other component has a milk fat content of at least 4.0 percent, other geometric forms and other conditions may be used in producing the compacted, freeze-dried cottage cheese products of the invention. For example, bars or blocks or other rectangular parallelpiped forms may be produced in the compaction of the freeze-dried cottage cheese. In producing these or the disc forms, pressures from about 500 psi to about 1000 psi may be employed. It is desirable to employ sufficient pressure to effect a compression ratio of at least 3:1, but not above about 4:1 since too high a compression ratio results in too slow rehydration of the compacted, freeze-dried cottage cheese product as well as more or less of a loss of curd identity in the rehydrated cottage cheese. In general, it is best that the blend of freeze-dried cottage cheeses have an overall milk fat content of at least 2.0 percent, but not above about 3.0 percent since too little milk fat will result in poor adhesion of the particles of freeze-dried cottage cheese and, therefore, too great a tendency of the compacted, freeze-dried cottage cheese to fracture when being handled or shipped; and too high a concentration of milk fat will result in a compacted, freeze-dried cottage cheese product which will not absorb water very well and will, therefore, take much too long to rehydrate. In general, it is possible to blend the low milk fat content freeze-dried cottage cheese and the high milk fat content freeze-dried cottage cheese in other proportions than the 50:50 proporation described, provided that the milk fat content of the resulting blend comes within the range described above and the pressure employed during compacting the blend is within the range described above.

It is to be understood that the low milk fat content cottage cheese has a milk fat concentration of less than 0.5 percent by weight prior to freeze-drying thereof.

It is also to be understood that the compacted, freeze-dried cottage cheese food product may be hermetically sealed in various other types of moisture and oxygen impermeable containers, such as aluminum foil and plastic film laminates, the prime requisite being that the compacted, freeze-dried cottage cheese food product be maintained at a moisture content less than 2.0 percent and substantially free of oxygen.

The present invention results in the production of compacted, freeze-dried cottage cheese which is readily rehydrated without loss of curd identity and which is highly acceptable even after long-term storage at room temperature or even somewhat higher temperatures provided the compacted, freeze-dried cottage cheese is hermetically sealed in the substantial absence of oxygen. The product is highly desirable because of its compactness and the good quality of the reconstituted cottage cheese prepared therefrom.

We wish it to be understood that we do not desire to be limited to the exact details described, for obvious modifications will occur to a person skilled in the art.

We claim:

1. Method of making compacted, freeze-dried cottage cheese which is readily rehydratable to form an acceptable reconstituted cottage cheese food product having good curd identity which comprises the steps of:
   a. freeze-drying dry curd cottage cheese having a large curd size and a milk fat content of less than 0.5 percent prior to freeze-drying,
   b. freeze-drying creamed cottage cheese having a large curd size and a milk fat content of about 4 to 4.5 percent prior to freeze-drying,
   c. blending substantially equal quantities by weight of said freeze-dried, dry curd cottage cheese and said freeze-dried, creamed cottage cheese, and
   d. compressing said blend of freeze-dried, dry curd cottage cheese and freeze-dried, creamed cottage cheese at a pressure of from about 500 psi to about 1000 psi, using a dwell time of at least about 10 seconds, whereby a compacted, freeze-dried cottage cheese having good curd identity upon rehydration thereof is obtained.

2. Method according to claim 1, wherein said compacted, freeze-dried cottage cheese is hermetically sealed in a container which is moisture vapor and oxygen impermeable, whereby said compacted, freeze-dried cottage cheese is made storage-stable.

3. A storage-stable, compacted, freeze-dried cottage cheese which is readily rehydratable to form an acceptable reconstituted cottage cheese food product having good curd identity and which is characterized by being a blend of a freeze-dried, low milk fat (less than 0.5 percent milk fat prior to freeze-drying) cottage cheese and a freeze-dried, high milk fat (4.0 to 4.5 percent milk fat prior to freeze-drying) cottage cheese, said blend of freeze-dried cottage cheeses having a milk fat content of from about 2.0 to about 3.0 percent, said compacted, freeze-dried cottage cheese having a compression ratio of from about 3:1 to about 4:1 and a moisture content of less than 2.0 percent by weight and being hermetically sealed in a a moisture and oxygen impermeable container in the substantial absence of oxygen.

4. A storage-stable, compacted, freeze-dried cottage cheese in accordance with calim 3, wherein said blend is about a 50:50 blend of said freeze-dried, low milk fat cottage cheese and said freeze-dried, high milk fat cottage cheese.

* * * * *